United States Patent
Jouppi

(10) Patent No.: US 7,388,981 B2
(45) Date of Patent: Jun. 17, 2008

(54) TELEPRESENCE SYSTEM WITH AUTOMATIC PRESERVATION OF USER HEAD SIZE

(75) Inventor: Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 10/376,435

(22) Filed: Feb. 27, 2003

(65) Prior Publication Data
US 2004/0170300 A1 Sep. 2, 2004

(51) Int. Cl.
*G06K 9/00* (2006.01)
(52) U.S. Cl. .................. 382/154; 382/106; 382/103
(58) Field of Classification Search .......... 382/154, 382/298, 103, 106, 118; 725/99; 348/14.16, 348/14.08, 14.09, 14.01
See application file for complete search history.

(56) References Cited

U.S. PATENT DOCUMENTS

| 5,572,595 A | * | 11/1996 | Kumagai et al. ........... 382/106 |
| 6,031,934 A | * | 2/2000 | Ahmad et al. ............... 382/154 |
| 6,346,950 B1 | * | 2/2002 | Jouppi ........................ 345/660 |
| 6,914,622 B1 | * | 7/2005 | Smith et al. ............. 348/14.05 |
| 2002/0118861 A1 | | 8/2002 | Jouppi et al. | |

* cited by examiner

*Primary Examiner*—Matthew C. Bella
*Assistant Examiner*—Claire Wang

(57) ABSTRACT

A method and system for mutually immersive telepresencing are provided. A user is viewed at a user's location to provide a user's image. The size of the user's head is determined in the user's image. A surrogate having a surrogate's face display about the size of the user's head is provided. The user's image is processed based on the size of the surrogate's face display to provide an about life-size image of the user's head. The about life-size image is displayed on the surrogate's face display.

13 Claims, 4 Drawing Sheets

TELEPRESENCE SYSTEM WITH AUTOMATIC PRESERVATION OF USER HEAD SIZE

CROSS-REFERENCE TO RELATED APPLICATION

The present application contains subject matter related to co-pending U.S. patent application Ser. No. 09/784,902 and publication number US 2002/0118861 A1 by Norman Jouppi and Subramonium Iyer entitled "Head Tracking and Color Video Acquisition via Near infrared Luminance Keying".

BACKGROUND

1. Technical Field

The present invention relates generally to videoconferencing and more specifically to telepresence systems.

2. Background Art

Originally, video camera and audio systems were developed for improving communication among individuals who are separated by distance and/or time. The system and the process are now referred to as "videoconferencing". Videoconferencing sought to duplicate, to the maximum extent possible, the full range, level and intensity of interpersonal communication and information sharing which would occur if all the participants were "face-to-face" in the same room at the same time.

Behavioral scientists know that interpersonal communication involves a large number of subtle and complex visual cues, referred to by names like "eye contact" and "body language," which provide additional information over and above the spoken words and explicit gestures. These cues are, for the most part, processed subconsciously by the participants, and often communicate information that cannot be communicated in any other fashion.

In addition to spoken words, demonstrative gestures, and behavioral cues, face-to-face contact often involves sitting down, standing up, and moving around to look at objects or charts. This combination of spoken words, gestures, visual cues, and physical movement significantly enhances the effectiveness of communication in a variety of contexts, such as "brainstorming" sessions among professionals in a particular field, consultations between one or more experts and one or more clients, sensitive business or political negotiations, etc. In situations where the participants cannot be in the same place at the same time, the beneficial effects of face-to-face contact will be realized only to the extent that each of the remotely located participants can be "recreated" at each site.

Although videoconferencing has come into widespread use, it is still of limited use because of the inability to very closely approximate for a user the recreation of the remotely located participants. The systems generally use fixed-location cameras and conference-type telephones. There is no sense of the presence of the user being at the site of a remote meeting or of the presence of the remotely located participants being with the user.

To overcome these problems, a system called "robotic telepresence" has been developed. In robotic telepresence, a remotely controlled robot simulates the presence of the user for the remotely located participants. The user has a freedom of motion and control over the robot and video input that is not present in traditional videoconferencing, and this better simulates the feeling of the user being present in person at a remote site. The overall experience for the user and the people interacting with the robotic telepresence device is very much superior to videoconferencing.

The robot platform typically includes a camera, a display device, a motorized platform that includes batteries, a control computer, and a wireless computer network connection. An image of the user is captured by a camera at the user's location and displayed on the display of the robotic telepresence device in the remote site.

More recently, a robotic telepresence system has been developed, which has a user station at a first geographic location and a robot at a second geographic location. The user station is responsive to a user and communicates information to and from the user. The robot is coupled to the user station and provides a three dimensional representation of the user transmitted from the user station. The robot also senses predetermined types of information and communicates the sensed information back to the user to provide a representation for the user of the robot's surroundings.

Additionally, a system has been developed for head tracking and color video acquisition via near-infrared luminance keying where the head of a user is tracked in real time. A near-infrared camera is equipped with filters that discern the difference between a near-infrared light illuminated rear projection screen behind the user and any foreground illumination to acquire a near-infrared image of the user. A color image of the user's head and the projection of a remote location are acquired by a color camera placed in close proximity to the near-infrared camera. A bounding box is placed around the near-infrared image of the user's head and translated to the view space of the color camera. The translated image is used to crop the color image of the user's head for transmission to the remote location.

However, there are many problems that still need to be addressed to provide improved robotic telepresence realism; i.e., to make the user appear to be present in person.

Solutions to problems of this sort have been long sought, but have long eluded those skilled in the art.

DISCLOSURE OF THE INVENTION

The present invention provides a method and system for mutually immersive telepresencing. A user is viewed at a user's location to provide a user's image. The size of the user's head is determined in the user's image. A surrogate having a surrogate's face display about the size of the user's head is provided. The user's image is processed based on the size of the surrogate's face display to provide an about life-size image of the user's head. The about life-size image is displayed on the surrogate's face display. This provides a means to more closely simulate the feeling of the actual presence of a user during videoconferencing with a life-size image presented on the display.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
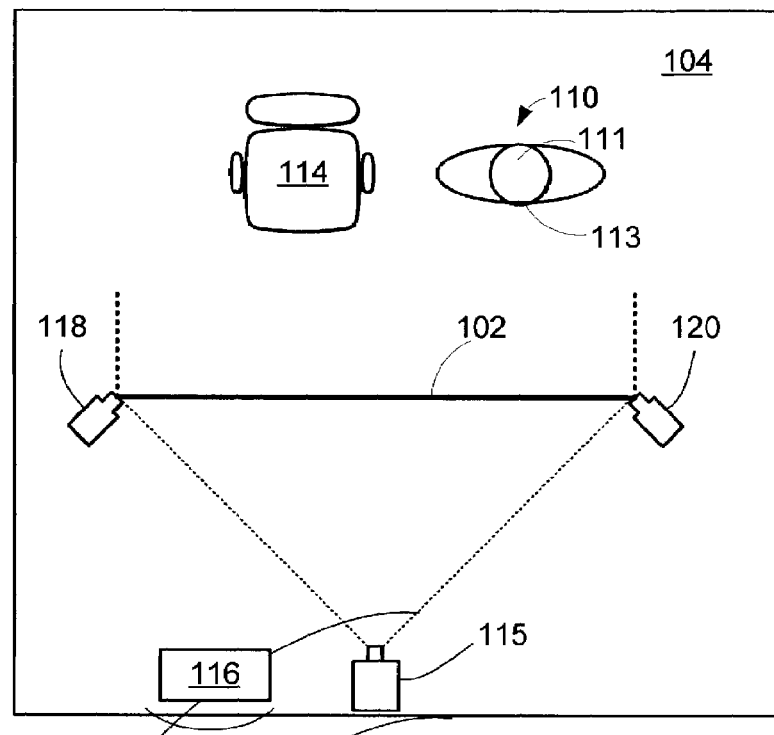
FIG. 1 is an overview of a Mutually-Immersive Mobile Telepresence System.
Figure 1:
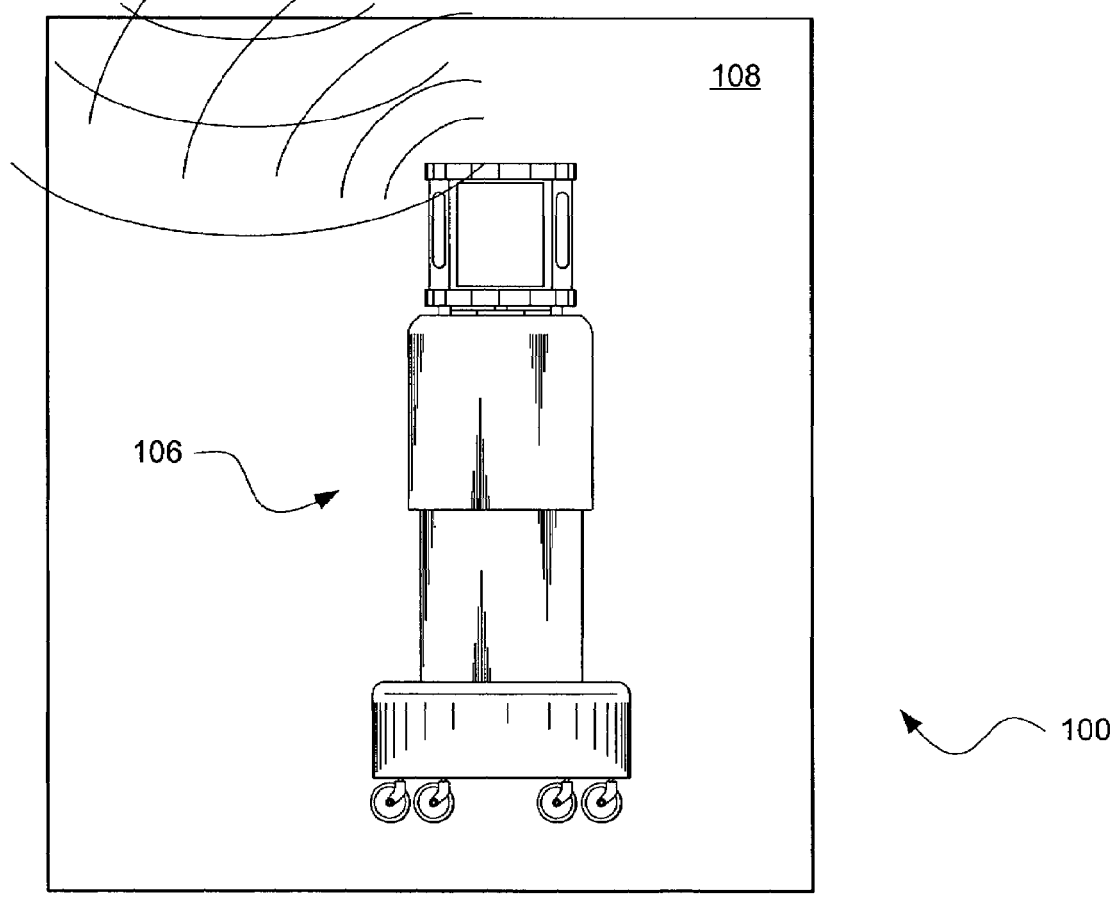

The present invention relates to a Mutually-Immersive Mobile Telepresence (E-Travel) System. The user sits in front of a display showing the remote location, and a robot device is located at a remote location having a display of the user. Video and audio are transmitted between the display and the robot device. The robot device may have a humanoid as well as a non-humanoid shape, and is referred to as a "surrogate".

Behavioral scientists know that interpersonal communication involves a large number of subtle and complex visual cues, referred to by names like "gaze" and "eye contact," which provide additional information over and above the spoken words and explicit gestures. Gaze relates to others being able to see where a person is looking and eye contact relates to the gazes of two persons being directed at the eyes of the other. These cues are, for the most part, processed subconsciously by the people, and often communicate vital information.

In situations where all the people cannot be in the same place at the same time, the beneficial effects of face-to-face contact will be realized only to the extent that a remotely located person, or "user", can be "recreated" at the site of the meeting where the "participants" are present.

It has been discovered by the inventor during experimentation with various robotic telepresence systems that people are used to relating to other people whose heads are roughly the same size as their own. People use the fact that most adult heads are roughly the same size in a number of ways.

First, it makes identifying distances to people easier. For example, if a person's face were presented in a larger-than-life size, a viewer would say the person is "in your face". Similarly, if a person's head were presented in a significantly smaller-than-life size, some people would describe the person as being more "distant" than if they had viewed the person at a scale matching real life.

Second, such phrases as "big headed" and "small headed" have negative connotations. Studies have shown that users associate artifacts in the presentation of people's images with shortcomings in the people themselves.

Third, young people's heads appear smaller than adult heads. Thus, a smaller appearing head creates the impression of being younger.

Fourth, having a person's face presented at near life-size aids in the identification of facial expressions and an accurate perception of gaze.

Fifth, changes in the orientation of a user's head in a telepresence system should not change the perceived size of the user's head. For example, in one of the inventor's original telepresence head-tracking systems, the display scaled the user's head to fit and fill the surrogate's face display panels. Thus, if the user's head tilted forward increasing the head's virtual width, the original system would shrink the user's head so that it would continue to fit. Similarly, if the user's head turned to the left or right, the user's head would sometimes shrink or expand. It has been discovered that these behaviors are undesirable and do not occur if the user's head size is recreated accurately.

Finally, it has been discovered that to immersively create the perception that a user is physically present at the surrogate's location, it is necessary to present the user's head at the same size as if the user were physically present.

It has also been discovered that besides accurately creating the size of the user's head, the head image must be pleasingly positioned on the surrogate's face display. This has been found to be extremely difficult since the tilting of the user's head or large hairstyles may make the user's head larger than can be displayed on the surrogate's face displays.

Thus, it has been found to be desirable to preserve the actual head size of a user by displaying the user's head with the same width, height, and length as if the user were physically present. It has also been found to be desirable to present the user's head in a visually pleasing position on the surrogate's face display, while only requiring modest amounts of video manipulation and computation to do so.

Referring now to FIG. 1, therein is shown a Mutually-Immersive Mobile Telepresence System 100. The system 100 includes a user's display 102 at a user's location 104 and a robotic device or a surrogate 106 at a surrogate's location 108.

A user 110 may sit in a chair 114 or stand with the user's head 111 and the user's face 113 facing the user's display 102 on which an image of the surrogate's surroundings may be back-projected from a projector 115. The surrogate 106 is connected to the user's display 102 via a high-speed network 112 through a user's transceiver-computer system 116.

First and second camera sets 118 and 120 are set a the corners of the user's display 102 to view the user 110 and transmit an image of the user's face 113 to the surrogate 106.

Figure 2:
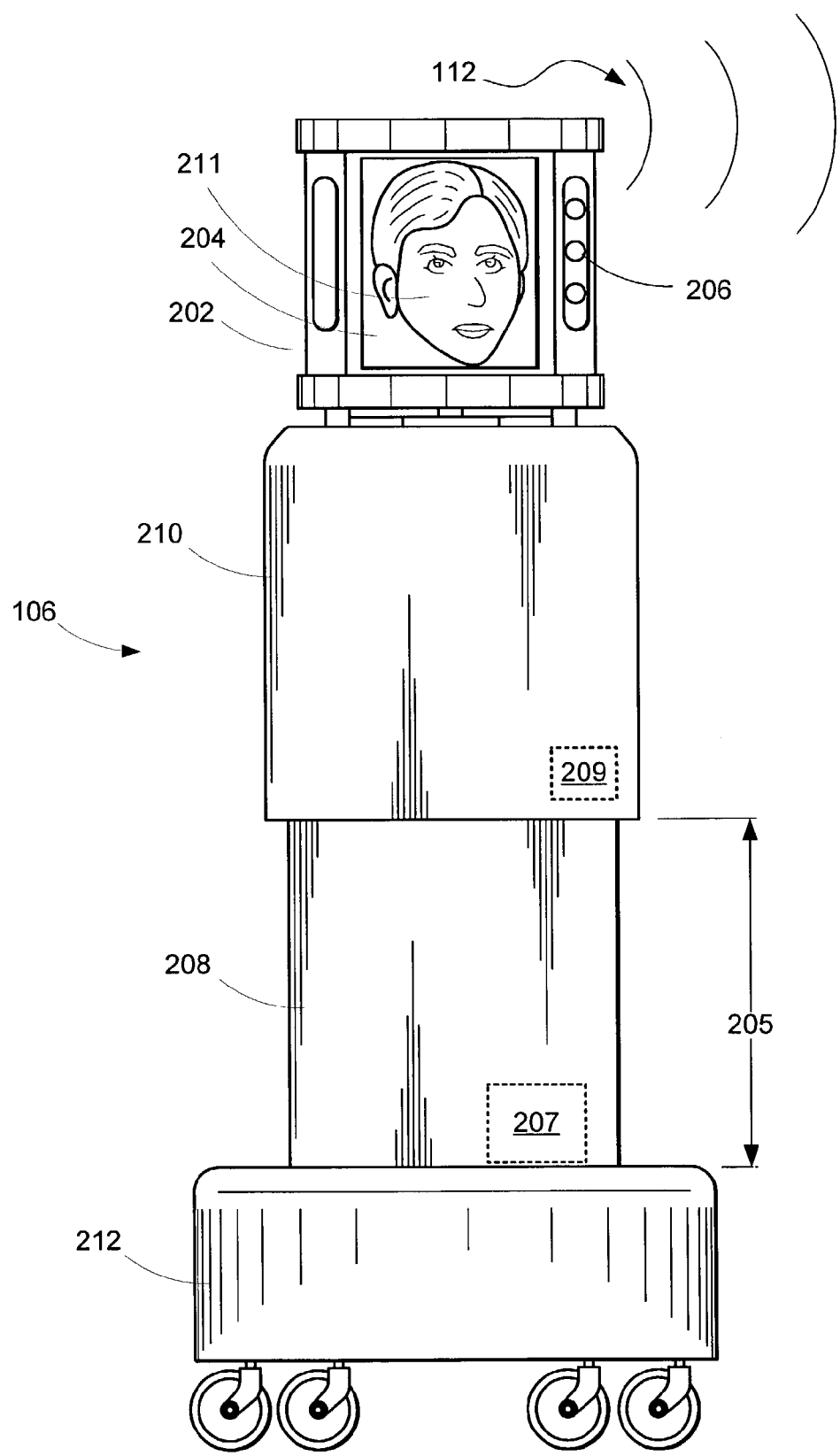
FIG. 2 is a view of the surrogate in accordance with the present invention.

Referring now to FIG. 2, therein is shown the surrogate 106 in accordance with the present invention. The surrogate 106 has a surrogate's head 202 made with one or more surrogate's face displays 204, which could be made of one or more liquid crystal display (LCD) panels.

One or more surrogate's cameras 206 in the surrogate's head 202 capture live video images at the surrogate's location 108. The images from the surrogate's cameras 206 in the surrogate's head 202 are compressed and transmitted over the high-speed network 112 by a surrogate's transceiver-computer system 207 in the surrogate 106 to the user's transceiver-computer system 116 (shown in FIG. 1) at the user's location 104.

The surrogate 106 is made in two parts that are movable relative to each other over a distance 205. One part is a leg portion 208 and one part is a torso portion 210. A monitor 209 is connected to the surrogate's transceiver-computer system 207 to sense the extension or height of the torso portion 210 relative to the leg portion 208. The surrogate's head 202 is mounted above the torso portion 210, and the torso portion 210 may be raised or lowered relative to the leg portion 208 so as to raise or lower the surrogate's head 202 relative to the surface on which the surrogate 106 moves or is moved. The surrogate 106 includes a drive portion 212, which permits movement of the surrogate 106.

In the present invention, an image of the user's head 111 (of FIG. 1) must be acquired in a way in which the scale of the image is known for display as a head image 211. It is not enough to assume that all people have the same head size, for several reasons. Depending on a person's hairstyle (ranging from a shaved head for men to a bouffant or beehive hairdo for women), the actual size of a person's head may vary greatly. Also, children have smaller heads than adults. Further, users are more comfortable when they have a reasonable range of freedom of movement and are not constrained to sit or stand in a precisely positioned location while using the system 100 for long periods of time. The user 110 will thus be free to move closer or further away from the first and second camera sets 118 and 120 of FIG. 1, the scale of the user's image is not known a priori.

Also, once the scale of the user's image is known, the head image 211 must be shown upon the surrogate's face displays 204 at life-size. The head image 211 of the user's head 111 must also be positioned within surrogate's face displays 204 in the most pleasing manner with relatively little image manipulation and computation. This means the positioning of the head image 211 should be stable and devoid of jitter and other artifacts.

To determine the position of the user's head 111 in X, Y, and Z coordinates relative to the first and second camera sets 118 and 120, several techniques may be used. Conventionally known near-infrared (NIR) difference keying or chroma-key techniques may be used with camera sets, which may be combinations of near-infrared or video cameras.

Figure 3:
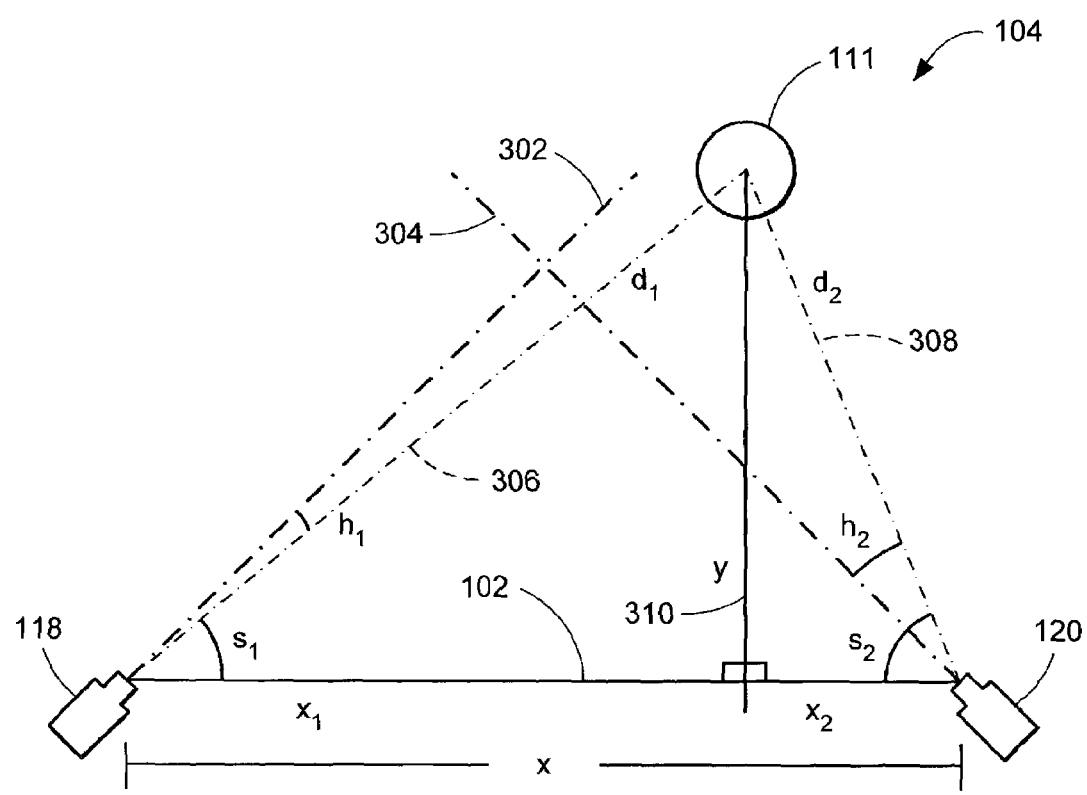
FIG. 3 is a view of the user's location in accordance with the present invention.

Referring now to FIG. 3, therein is shown the user's location 104 looking down from above. In this embodiment, the first and second camera sets 118 and 120 are used as an example. The distance x between the first and second camera sets 118 and 120 is known, as are angles $h_1$ and $h_2$ between centerlines 302 and 304 of sight of the first and second camera sets 118 and 120, and centerlines 306 and 308 respectively to the user's head 111. It is also known that the first and second camera sets 118 and 120 have the centerlines 302 and 304 set relative to each other; e.g., 90 degrees. If the first and second camera sets 118 and 120 are angled at 45 degrees relative to the user's display 102, the angles between the user's display 102 and the centerlines 306 and 308 to the user's head 111 are $s_1=45-h_1$ and $s_2=45+h_2$.

From trigonometry:

$$x_1 * \tan s_1 = y = x_2 * \tan s_2 \quad \text{Equation 1}$$

and $$x_1 + x_2 = x \quad \text{Equation 2}$$

so $$x_1 * \tan s_1 = (x - x_1) * \tan s_2 \quad \text{Equation 3}$$

regrouping $$x_1 * (\tan s_1 + \tan s_2) = x * \tan s_2 \quad \text{Equation 4}$$

solving for $x_1$ $$x_1 = (x * \tan s_2)/(\tan s_1 + \tan s_2) \quad \text{Equation 5}$$

and knowing either $x_1$ or $x_2$, compute y.

(To reduce errors, compute y 310 from both and take the average value.)

Then the distances from each camera to the user can be computed as follows:

$$d_1 = y/\sin s_1 \quad \text{Equation 6}$$

$$d_2 = y/\sin s_2 \quad \text{Equation 7}$$

Figure 4:
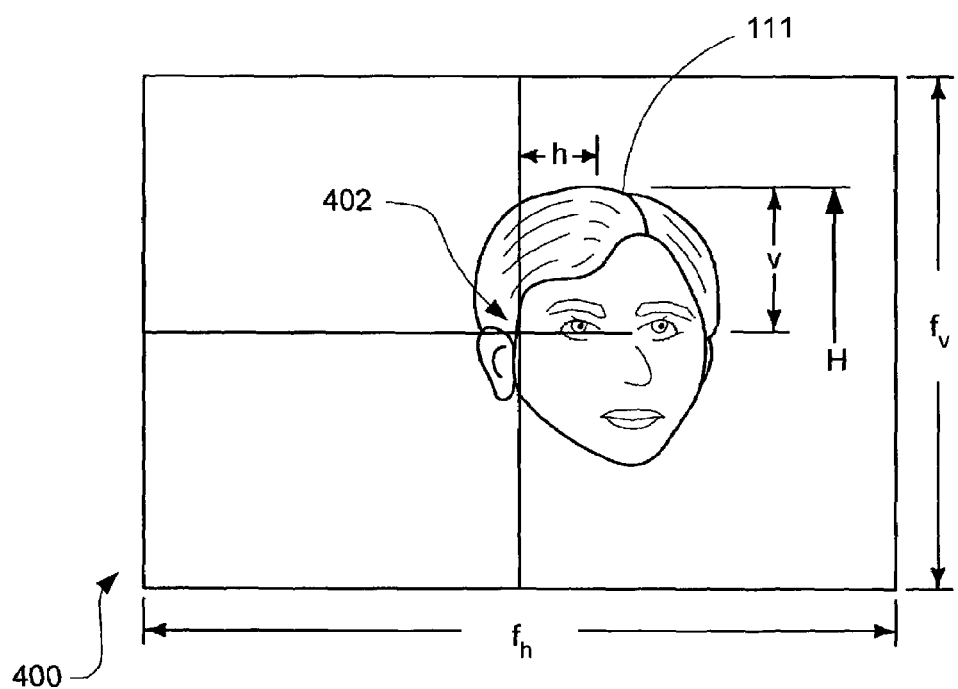
FIG. 4 is a view from one of the cameras mounted beside the user's display in accordance with the present invention.

Referring now to FIG. 4, therein is shown a user's image 400 from either the first and second camera sets 118 or 120 mounted beside the user's display 102 used in determining the user's head height.

The combination of camera and lens determines the overall vertical ($f_v$) and horizontal ($f_h$) fields of view of the user's image 400. Based on this and the position of the user's head 111 in the field of view, the horizontal (h) and vertical (v) angles can be computed by a processor between the top center of the user's head 111 and an optical center 402 of the user's image 400. From this, the height H of the user's head 111 above a floor can be computed.

Once the distance to the user's head 111 from each of the camera sets 118 and 120 is known, the scale of the user's head 111 in terms of a linear measure per angular percentage of the camera's field of view can be determined to provide the scale of the head image 211 in FIG. 2 and to preserve head size.

For example, the size of the user's head 111 could be about one inch per 3% of the camera's field of view $f_h$. Since the surrogate's transceiver-computer system 207 (in FIG. 2) knows the width of the surrogate's face displays 204 (for example, about 10 inches wide), then 30% of the width of the user's image 400 should be displayed to maintain the head image 211 at life-size on a ten-inch wide display.

Figure 5:
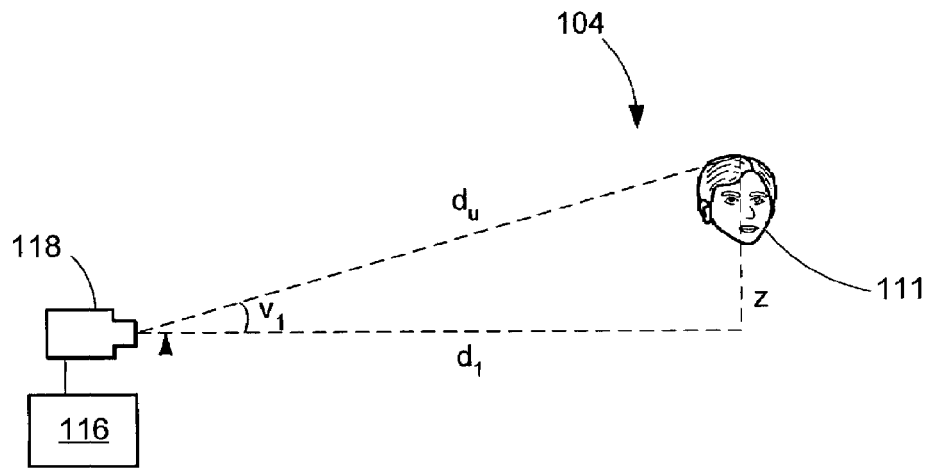
FIG. 5 is a mode of preserving head size of a user on a surrogate in accordance with the present invention.

Referring now to FIG. 5, therein is shown a mode of preserving head size of the head image 211 of FIG. 2.

If the distance to the user's head $d_u$ is 48 inches, and the horizontal field of view $f_h$ (in FIG. 4) of the camera's lens is 40 degrees, from trigonometry, one inch perpendicular to the distance vector $d_u$ would subtend an angle of arctan (1/48) =1.193 degrees at the position of the first camera set 118. Since the camera's field of view is 40 degrees, each inch of the user's head 111 must subtend $100*(1.193/40)=2.98\%$ of the horizontal width of the user's image 400.

Once the scale for displaying the head image 211 of the user's head 111 on each of the surrogate's face displays 204 are known, it is necessary to compute how to position it on the surrogate's face displays 204 of FIG. 2.

It has been discovered that presenting the head image 211 with the user's face 113 (of FIG. 1) in a classic portrait style similar to that found in high-school yearbooks is generally found to be attractive and visually pleasing.

It has also been discovered if the width of the head image 211 fits in the surrogate's face display 204, the head image 211 will be horizontally centered. Then, it has been found that setting the vertical position so that there is about one inch of background between the head image 211 and the top edge of the surrogate's face display 204 will provide a visually pleasing image. This is much more visually pleasing than having the head image 211 abutting the top of the surrogate's face display 204.

If the size of the head image 211 is wider than the surrogate's face display 204 (which occurs only with very large hairstyles), it has been discovered that it is necessary to crop the head image 211 based on the following general principles. First, it is necessary to measure the orientation of the user's head 111. This orientation can be determined by using body orientation as determined using computer related components. The computer related components could be a position sensor and a position/orientation measuring system, such as the Polhemus Fastrak available from Polhemus Incorporated of Colchester, Vt. 05446, which is capable of providing dynamic, real-time, six degree-of-freedom measurement of position (X, Y, and Z Cartesian coordinates) and orientation (azimuth, elevation, and roll).

For example, if the user 110 (of FIG. 1) is facing within 45 degrees towards the first camera set 118, both sides of the head image 211 are cropped evenly. If the head image 211 is closest to a profile orientation, the backside of the head image 211 is cropped (i.e., removing some hair but keeping the entire user's face 113). If the back of the user's head 111 is towards the first camera set 118, each side of the head image 211 is cropped equally.

If the head image 211 is taller than the surrogate's face display 204 (again, usually only in cases of extreme hairstyles), the top and bottom of the head image 211 is cropped equally. This reduces the display of the top of the user's hair and neck approximating a close shot common in movies and television.

Finally, it has been discovered that it is useful to exponentially time weigh average the user's head 111 positions and sizes obtained above over about a second of time so that the users can nod their heads, shift position, scratch their nose, etc. without having the system 100 (of FIG. 1) go through the processing required to remove visible gestures from the surrogate's face display 204.

Figure 6:
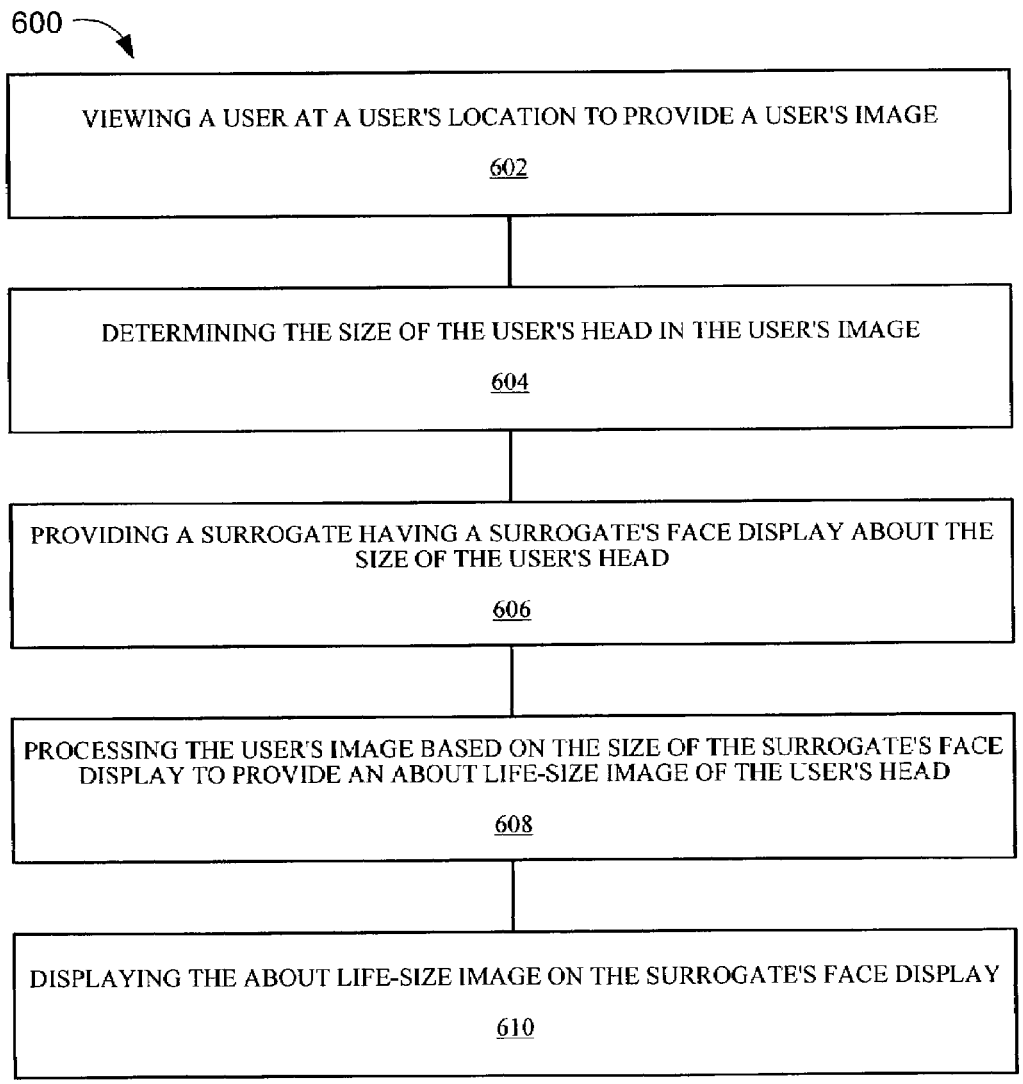
FIG. 6 is a method for mutually immersive telepresencing in accordance with the present invention.

Referring now to FIG. 6, therein is shown a method 600 for mutually immersive telepresencing in accordance with the present invention. The method 600 includes: a step 602 of viewing a user at a user's location to provide a user's image; a step 604 of determining the size of the user's head in the user's image; a step 606 of providing a surrogate having a surrogate's face display about the size of the user's head; a step 608 of processing the user's image based on the size of the surrogate's face display to provide an about life-size image of the user's head; and a step 610 of displaying the about life-size image on the surrogate's face display.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the spirit and scope of the included claims. All matters hithertofore set forth herein or shown in the accompanying drawings are to be interpreted in an illustrative and non-limiting sense.

The invention claimed is:

1. A method for mutually-immersive telepresencing comprising:
   viewing a user at a user's location to provide a user's image;
   determining the size of the user's head in the user's image;
   providing a surrogate having a surrogate's face display about the size of the user's head;
   processing the user's image based on the size of the surrogate's face display to provide an about life-size image of the user's head; and
   displaying the about life-size image on the surrogate's face display wherein
   displaying the about life-size image includes exponential time weighted averaging of a plurality of the user's images to display the about life-size image.

2. The method as claimed in claim 1 wherein:
   determining the size of the user's head includes determining the location of the user's head at the user's location.

3. The method as claimed in claim 1 wherein:
   determining the size of the user's head in the user's image includes determining a scale of the user's head; and
   displaying the about life-size image in a classic portrait style.

4. The method as claimed in claim 1 wherein:
   processing the user's image includes cropping to provide a close-up image of the face of the user.

5. A system for mutually-immersive telepresencing comprising:
   a camera set for viewing a user at a user's location to provide a user's image;
   a computer for determining the size of the user's head in the user's image;
   a surrogate having a surrogate's face display about the size of the user's head; and
   a processor for processing the user's image based on the size of the surrogate's face display to provide an about life-size image of the user's head and for displaying the about life-size image on the surrogate's face display wherein the processor includes means for exponential time weighted averaging of a plurality of the user's images to display the about life-size image.

6. The system as claimed in claim 5 wherein:
   the computer has components for determining the location of the user's head at the user's location.

7. The system as claimed in claim 5 wherein:
   the computer includes means for determining a scale of the user's head; and
   the surrogate's face display displays the about life-size image in a classic portrait style.

8. The system as claimed in claim 5 wherein:
   the processor includes means for cropping to provide a close-up image of the face of the user.

9. A system for mutually-immersive telepresencing comprising:
   a camera set for viewing a user at a user's location to provide a user's image;
   a computer for determining the size of the user's head in the user's image using a distance of the user's head in the image from where the user is viewed and a width of the user's head in the image;
   a surrogate having a surrogate's face display about the size of the user's head; and
   a processor for processing the user's image based on the size of the surrogate's face display to provide an about life-size image of the user's head and for displaying the about life-size image on the surrogate's face display.

10. The system as claimed in claim 9 wherein:
    the computer has components for determining the location and orientation of the user's head at the user's location.

11. The system as claimed in claim 9 wherein:
    the computer includes means for determining a scale of the user's head; and
    the processor includes means for displaying the about life-size image in a classic portrait style with a clearance between a top of the surrogate's face display and the about life-size image.

12. The system as claimed in claim 9 wherein:
    the computer has components for determining the location and orientation of the user's head at the user's location; and
    the processor includes means for cropping to provide a close-up image of the face of the user selected from a group consisting of:
       both sides cropped of the about life-size image of the user's head when the camera set views the user from within 45 degrees on either side of the face of the user,
       the backside cropped of the about life-size image of the user's head when the camera set views a profile of the user,
       both sides cropped of the about life-size image of the user's head when the camera set views the back of the user's head, and
       both top and bottom cropped of the about life-size image of the user's head when the camera set views the user's head providing a life-size image of the user's head which is taller than will fit in the surrogate's face display.

13. The system as claimed in claim 9 wherein:
    the processor includes means for exponential time weighted averaging of head position and scale computed from a plurality of the user's images before displaying the about life-size image.

\* \* \* \* \*